July 14, 1964  R. B. MACPHERSON  3,140,501
WINDSHIELD WIPER BLADE
Filed Oct. 12, 1961
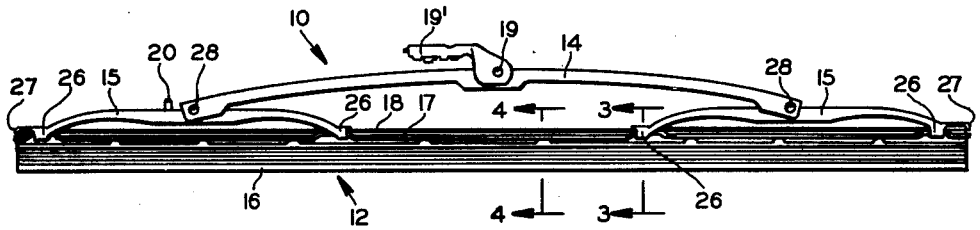
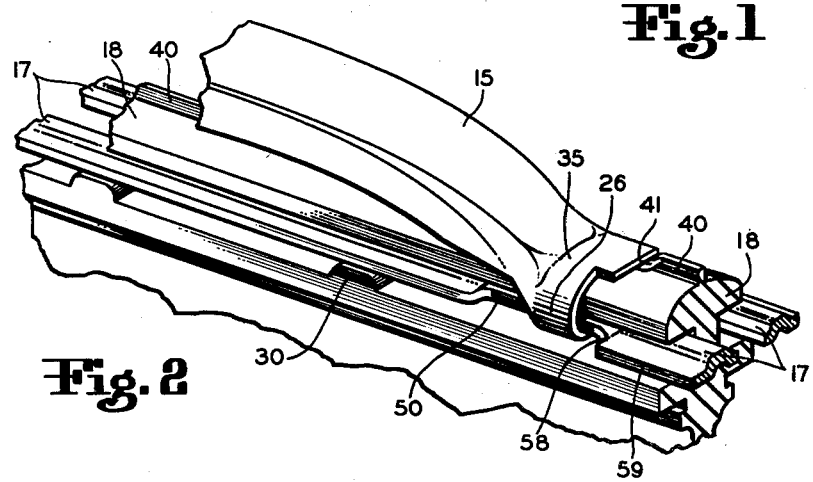
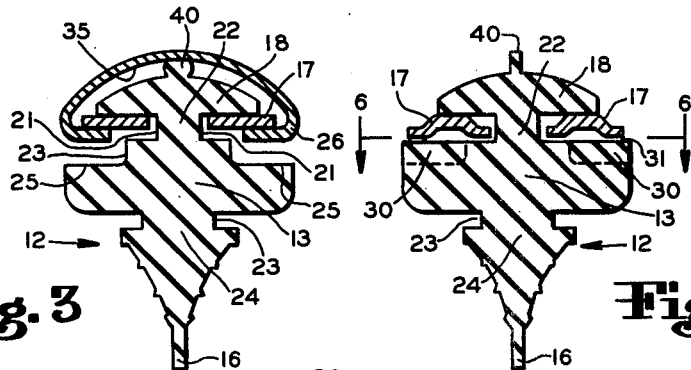
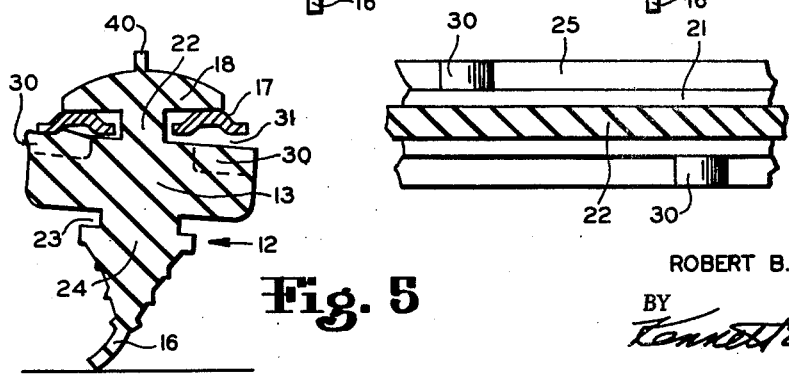
INVENTOR.
ROBERT B. MACPHERSON
BY
ATTORNEY

United States Patent Office 3,140,501
Patented July 14, 1964

3,140,501
WINDSHIELD WIPER BLADE
Robert B. Macpherson, Gary, Ind., assignor to The Anderson Company, a corporation of Indiana
Filed Oct. 12, 1961, Ser. No. 144,741
5 Claims. (Cl. 15—250.36)

This invention relates to a windshield wiper.

The majority of windshield wipers on the market today are, by their design, permitted to hinge or "layover" in one direction during a wiping stroke and to "layover" in the opposite direction on the return stroke. This feature is considered advantageous for effective wiping of a wet surface and does not add materially to the frictional drag exerted thereby. However, under conditions of a dry or tacky surface, "layover" causes excessive friction resulting in chatter and overload on the driving mechanism.

Windshield wipers are usually comprised of many articulated elements which are attached to permit relative free movement therebetween. These connections are most often relatively free fitting particularly after considerable use; and, therefore, cause noise upon reversal of the wiping stroke and at other areas of the wipe.

Therefore, any object of this invention is to provide a windshield wiper wherein the frictional drag of a wiping blade is lowered, particularly on a tacky surface.

Another object of this invention is to provide an improved windshield wiper blade wherein the amount of blade layover is controlled.

Another object of this invention is to provide an improved windshield wiper wherein resilient embossments on one portion coact with other portions of the wiper assembly to limit angular displacement of the wiping portion of the blade.

Another object of this invention is to provide an improved windshield wiper wherein means are provided to lessen noise and chatter between articulated parts.

Another object of this invention is to provide a windshield wiper wherein frictional means are provided to resist free linear movement of the blade relative to a pressure-applying superstructure.

Other objects and advantages of the invention will become apparent after the description hereinafter set forth is considered in conjunction with the drawings annexed hereto.

In the drawing:

FIGURE 1 is a side view of my improved windshield wiper including the pressure-applying superstructure therefor;

FIGURE 2 is an enlarged isometric view, partly in section, taken near one of the claws as shown in FIGURE 1;

FIGURE 3 is an enlarged cross-sectional view of FIGURE 1 taken along the line 3—3;

FIGURE 4 is an enlarged cross-sectional view of FIGURE 1 taken along the line 4—4;

FIGURE 5 is an enlarged cross-sectional view corresponding substantially to FIGURE 4 wherein "layover" of the squeegee unit illustrates my invention;

FIGURE 6 is an enlarged cross-sectional view taken along the line 6—6 of FIGURE 4, but showing an alternate form.

The same numerals are used throughout the several views to indicate like elements and parts.

In FIGURE 1, the numeral 10 indicates generally a windshield assembly having a wiping element 12, including a flexible support 17 therefor, operatively supported by a pressure-applying superstructure. This superstructure supports the wiping blade 12 through the backing member or support 17, commonly called a flexor. More specifically, a primary member or yoke 14 is pivotally connected at its outer ends to the mid-portion of secondary yokes 15, which, in turn, are slidably connected at their ends to flexor 17 at substantially equally spaced-apart locations therealong for applying pressure thereto, and for carrying the wiping member through its wiping strokes. This slidable connection is established by means of a pair of claws 26 which underlie flexor 17 from each side thereof for maintaining it in operative position. An adapter 19' is pivoted by pin 19 to yoke 14 to receive an outer end of an oscillating wiper arm (not shown) for transmitting pressure through yokes 14 and 15 to the wiping blade 12.

FIGURES 3 and 4 most clearly show the wiping element 12 in an upright unflexed and relaxed position. The wiping element 12 is divided into two main portions which include the back portion 18, received by claws 26 of secondary yokes 15, and wiping portion 13, which terminates in a narrow wiping edge 16. A pair of notches 21 are formed on opposite sides of wiping element 12 and establish a neck or intermediate portion 22 to provide a hinge between the back and wiping portions. The purpose of this hinge is to permit "layover" of the wiping portion relative to the back portion and pressure-applying superstructure during a wiping stroke. A second pair of notches 23 are provided to define a second neck 24, but no substantial hinge motion occurs here because of its relative size.

Notches 21 extend throughout the length of the blade on opposite sides thereof and receive a flexor or backing member 17 which may consist of separate parallel parts or they may be connected at their ends to define a unitary member. In either instance, the flexor 17 which acts as a support is received in grooves 21 and, since its transverse dimension is greater than its vertical thickness, permits flexure of wiping element 12 in a plane toward wiping edge 16 or perpendicular toward a surface being wiped; and resist flexure of this wiping element 12 in a plane transverse to the first-mentioned plane. Each parallel portion or leg of backing member 17 may be provided with longitudinally extending ribs which may diminish toward either end to control resistance to flexure throughout the length thereof. The central portion 59 of flexor 17 is wider than the end portions to provide two pairs of shoulders 58 for inner claws 26 of secondary yokes 15 to prevent linear movement of the backing member and wiping element out of the claws, once an assembled connection is established. Upwardly extending transverse ribs 50 in flexor 17 define seats for claws 26 whereby the claws when in position are substantially flush with the bottom of the linear portion of the flexor. Of course, flexors 17 need not be of ribbed formation; and may be of a flexible material of uniform thickness as well, or flexors of other shapes and design.

Pivot pins 28 establish the connection between primary yoke 14 and secondary yokes 15. Also, at least one of the connections may be of the quick-disconnect type as shown and described in an application of Fred A. Krohm, Serial No. 761,240, filed September 15, 1958, for "Detachably Connecting a Windshield Wiper Blade Unit and a Pressure Unit," and now Patent No. 3,003,175.

Notches 21 have underlying outer portions 53 extending parallel therewith throughout their length. Longitudinal surfaces 25 thereof underlie, by a substantial distance, lower outer edges of flexor 17. It is readily apparent that, if the cross section of FIGURE 3 extended throughout the length of the wiper element, considerable angular displacement would be permitted of the wiping portion 13 relative to back portion 18 through neck 22. If such "layover" of the wiping portion were permitted without restraint, excessive drag and friction mar the wiping stroke by chatter and cause excessive wear on the drive motor and linkage, this being particularly true if the wiped surface is tacky from semidry condition.

To overcome this difficulty, embossments 30 are provided on surface 25 projecting toward the bottom of flexor 17. These embossments preferably are placed on both surfaces 25 at the outer edges thereof. While the embossments are preferably transversely disposed, they may be staggered as suggested in FIGURE 6. The top surface of each embossment is substantially flush with the bottom wall of notch 21, however, this may vary either way. It will be noted in FIGURE 4 that a certain amount of space 31 may be established between the top of embossment 30 and the bottom of support 17 which permits a desirable amount of angular displacement or layover of the entire wiping portion 13, including tip or edge 16, relative to support 17. As drag increases, displacement of the wiping portion carrying the embossments will be substantially arrested in an angular position as shown in FIGURE 5. It is to be noted that the embossment on one side will be urged into support 17 thus establishing a cushioning stop substantially preventing further relative angular displacement of the blade.

By this arrangement of upward projections 30, or the like, from base 25, it is apparent that further angular displacement of the wiping portion becomes progressively more difficult. In this manner, the desired amount of angular displacement of the wiping portion during the wiping of a wet windshield is easily attained by reason of the connector or hinge 22 and space 31, if provided, under each side of support 17, and further angular displacement becomes increasingly more difficult even on a tacky or semidry windshield surface.

Another form which I wish to disclose is the provision of embossments transversely disposed on support member 17. Such embossments or protrusions extend toward the wiping portion 13, and would embed themselves into an underlying surface on the wiping portion upon relative angular displacement therebetween beyond a predetermined amount.

As above described, I have described an improved construction and arrangement relative to controlling the angular displacement of a portion of a windshield wiper blade during its wiping stroke.

Back portion 18 of wiping element 12 is adapted to be received by claws 26 of secondary yokes 15. FIGURES 2 and 4 show back portion 18 carrying an upstanding resilient rib 40 throughout its longitudinal extent. It is best illustrated in FIGURE 3 that this rib 40 bears lightly against an underneath end portion 35, not for the purpose of urging claws 26 into contact with bearing area 50 of support member 17, but to provide friction tending to eliminate noise between loose parts. Rib 40 is easily deformed as shown at 41 wherein it is beneath portion 35, adjacent claws 26 of yoke 15. The frictional engagement between end 35 and rib 40 restrains, yet permits, relative longitudinal movement therebetween as the elements comprising the wiping assembly are articulated in a direction toward the windshield surface being wiped. Normally whichever engagement has the most friction will not slide. In the illustration of FIGURE 1, secondary yokes 15 operatively receive the back of the wiping element at four spaced-apart locations for applying wiper arm pressure thereto. To conform blade 12 to a curved or irregular surface, relative linear movement must be permitted between the blade and end of yokes 15. The dimensions of rib 40 are maintained so that there is no interference with flexure, but enough interference is present to prevent chatter and noise.

It is pointed out that the improvement pertaining to the embossments is not limited to use with the longitudinal rib improvement on the back portion of wiping element 12; nor is the rib improvement limited to use with the embossments. Each is independently useful. However, the two improvements can be used together very well.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:
1. A windshield wiper blade comprising:
   an elongate resilient wiping element having backing means permitting flexure of the wiping element in one plane but resisting flexure in a plane substantially transverse to the first-mentioned plane,
   said wiping element having a back portion and a wiping portion,
   outer longitudinal portions of said wiping portion underlying the backing means, and
   resilient means located on the outer longitudinal portion between the outer longitudinal portion and the backing means at spaced-apart locations to provide cushioning means to resist angular displacement of the wiping portion relative to the support means.

2. A windshield wiper blade comprising:
   an elongated resilient wiping element having a backing means permitting flexure of the wiping element in one plane but resisting flexure in a plane transverse to the first-mentioned plane,
   said wiping element having a back portion and a wiping portion,
   outer longitudinal portions of the wiping portion underlying the backing means and spaced apart therefrom,
   and spaced-apart resiliently deformable means located in the defined space and carried by at least one longitudinal portion to resiliently resist angular displacement of the wiping portion relative to the backing means.

3. A windshield wiper blade comprising:
   an elongate resilient wiping element having a back portion and a wiping portion connected by a neck portion defining a hinge therebetween,
   support means for the wiping element positioned astride the hinge and adapted to permit angular displacement of the wiping element relative to the support means about said hinge,
   said wiping portion including a portion underlying outer edges of the support means and having spaced-apart resilient embossments thereon for contact with the support means whereby angular displacement of the wiping portion relative to the support means about the hinge is resiliently resisted.

4. A windshield wiper blade comprising:
   an elongate resilient wiping element including a wiping edge,
   an elongate support carried by the wiping element and being flexible in one plane whereby the wiping element is flexible in a plane toward said wiping edge and normal to a surface being wiped and is relatively inflexible in a plane normal to the first-mentioned plane,
   said support is adapted to receive an articulated pressure-applying means at spaced-apart locations for receiving pressure therefrom in the direction of the first-mentioned plane,
   said wiping element including a portion contiguously underlying outer edges of the elongate support and having spaced resilient embossments thereon facing the elongate support so as to contact the elongate support to resist angular displacement of the wiping element relative to the support.

5. The structure of claim 3 wherein the first-mentioned relative angular displacement in a first range is relatively free and wherein further relative angular displacement in a second range meets the resistance of the embossments.

References Cited in the file of this patent
UNITED STATES PATENTS
3,021,549    O'Shei _____ Feb. 20, 1962
3,035,298    Scinta _____ May 22, 1962